Feb. 18, 1930.                J. J. CRAIN                  1,747,349
                CONTROLLING DEVICE FOR SHIPS' STEERING GEARS
                    Filed June 3, 1926        3 Sheets-Sheet 1
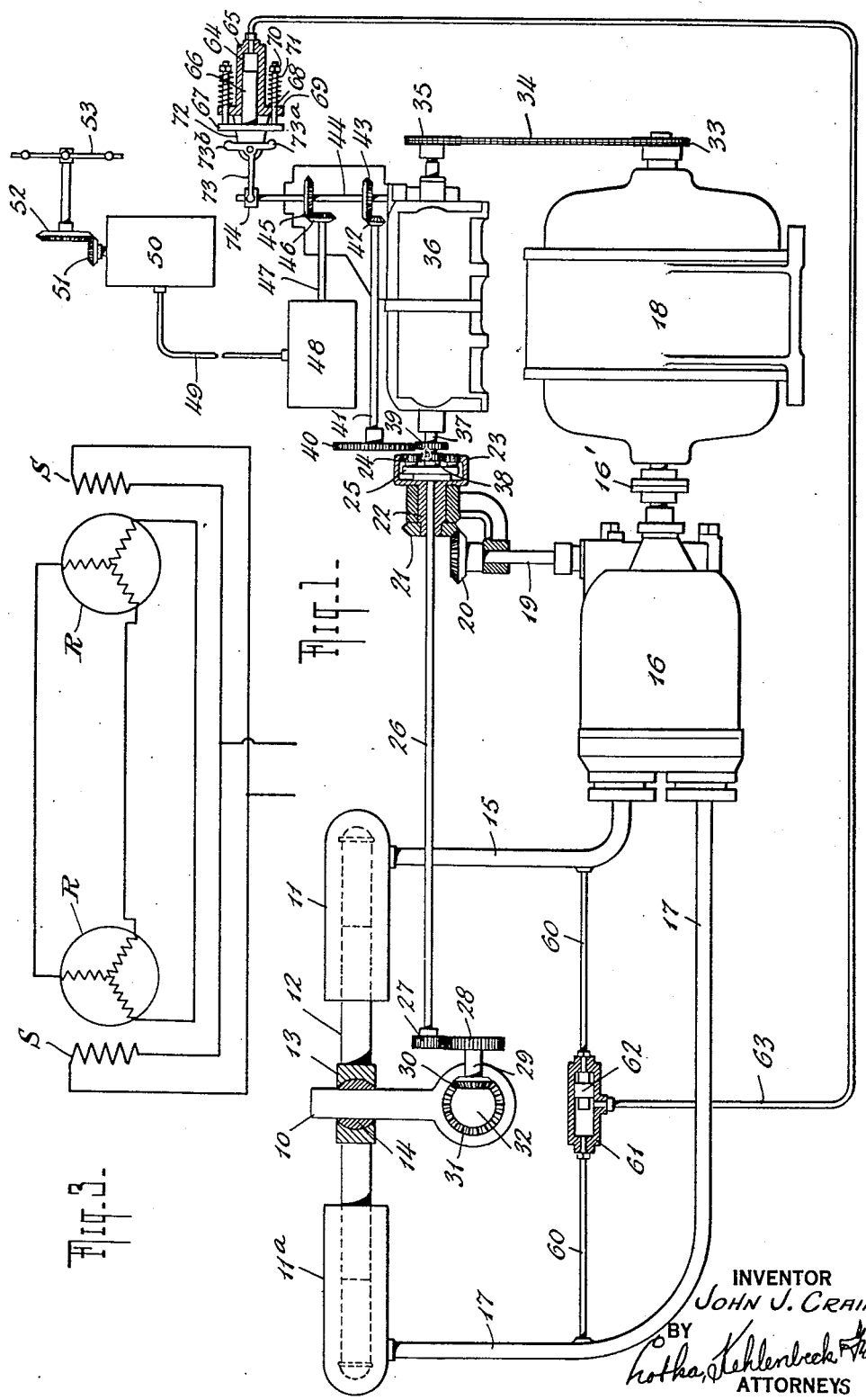

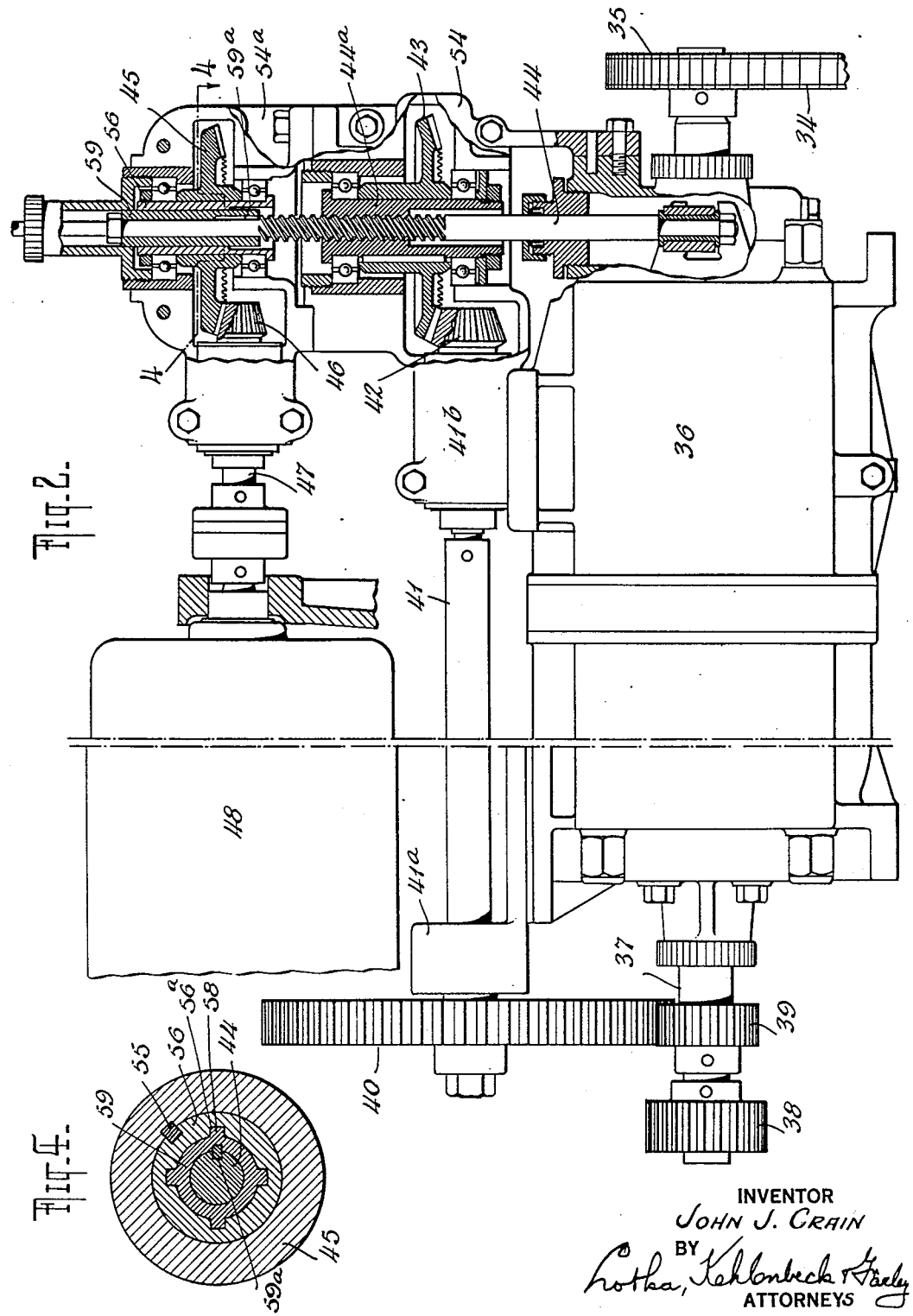

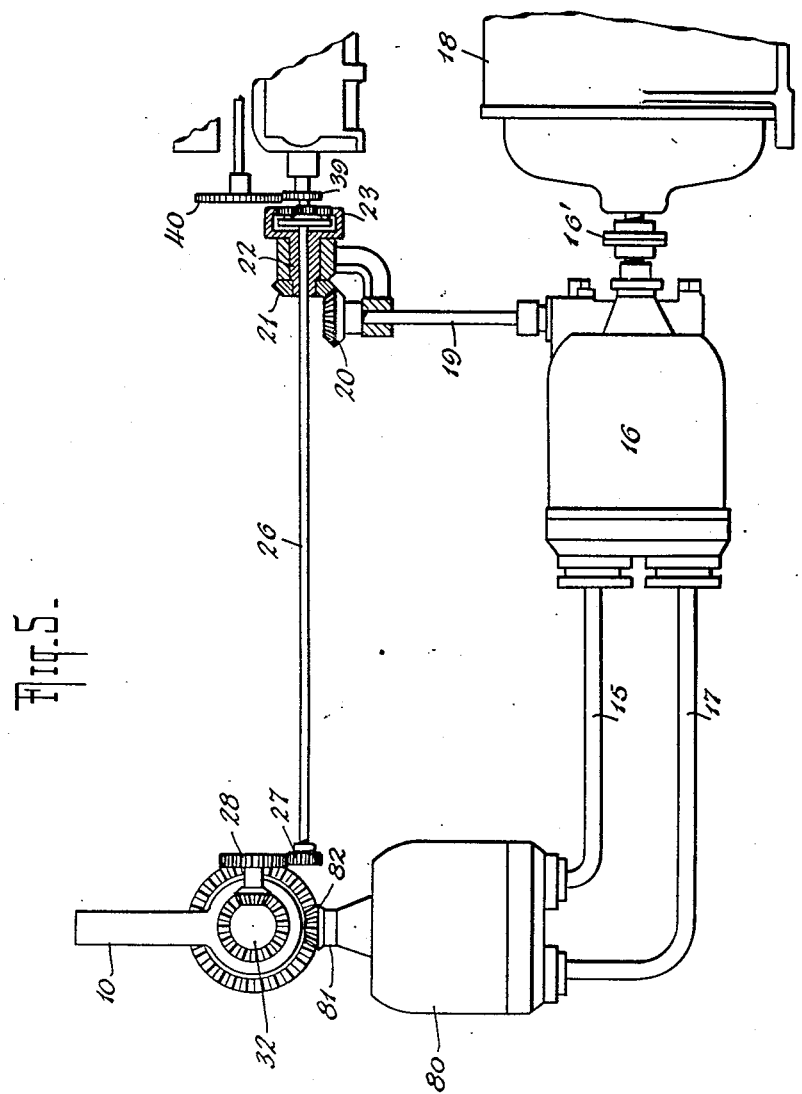

Patented Feb. 18, 1930

1,747,349

UNITED STATES PATENT OFFICE

JOHN J. CRAIN, OF WATERBURY, CONNECTICUT, ASSIGNOR TO THE WATERBURY TOOL COMPANY, OF WATERBURY, CONNECTICUT, A CORPORATION OF CONNECTICUT

CONTROLLING DEVICE FOR SHIPS' STEERING GEARS

Application filed June 3, 1926. Serial No. 113,544.

This invention relates to steering gears for ships and has for its principal object to provide a new and improved power operated control, particularly adapted for use with electro-hydraulically operated steering gears.

A further more specific object of the invention is to provide a new and improved automatically operating pressure control for the hydraulic variable speed gear which will reduce the speed of the gear when the ship's rudder approaches its limits of extreme inclination.

Other objects such as reliability and flexibility of operation and control will appear more fully from the following more detailed description and by reference to the accompanying drawings, forming a part hereof.

In the drawings, Fig. 1 is a diagrammatic plan of an electro-hydraulic steering gear and control installation, constructed in accordance with the principles of my invention; Fig. 2 is an enlarged side elevation of the hydraulic variable speed gear, follow-up control shaft, and synchronous receiving motor, some of the parts being shown in section; Fig. 3 is a diagram of the electrical connections for the synchronous transmitter and receiver; Fig. 4 is a section on the line 4—4 of Fig. 2; and Fig. 5 is a partial view similar to Fig. 1 of a slightly modified construction.

As shown in the drawings, the numeral 10 indicates the tiller or cross head of the ship's rudder. Located, one on each side, of the tiller 10 are a pair of hydraulic cylinders 11, 11ª, each of which have slidably mounted therein one end of a hydraulic plunger 12, which is provided substantially midway between its ends with a bearing block 13, having a spherically shaped central bore, in which a similarly shaped bearing 14 is neatly, but rotatably mounted, the bearing 14 being provided with a central aperture in which the tiller 10 is slidably received. The cylinder 11 is connected, by means of the pipe 15, with one of the ports of a hydraulic variable delivery pump 16, while the cylinder 11ª is connected to the other port of said pump by means of the pipe 17. The pump, which is of the well known type of pumps commonly employed for hydraulic speed gears, such as disclosed in the United States patent to Harvey D. Williams #1,044,838, granted November 19, 1912, forms no part of the present invention and therefore the details of construction thereof have not been shown in the drawings. Such pumps are well known, however, and it will be sufficient to state that they consist of a driven shaft to which is secured a rotary barrel, having a plurality of cylinders, parallel with the driven shaft and in which reciprocate pistons. Said pistons are connected with a swash plate, the angle of inclination of which may be varied to vary the stroke of the pistons and therefore the output, or the amount of fluid delivered by the pump, for each revolution of the cylinder barrel; the angle of inclination of the swash plate preferably being adjusted by the rotation of a control shaft, operatively connected with a tilting box in which the swash plate is rotatably mounted. When the tilting box and swash plate are perpendicular to the shaft, or in the "neutral position", the pistons have no stroke and no fluid is pumped. As the control shaft is rotated to tilt the swash plate the stroke of the pistons and the output of the pump is increased as the angle of inclination increases. When the swash plate is inclined in one direction to the vertical, the port to which the pipe 17, for example, is connected, becomes the pressure port of the pump and the other port the suction port, while when the swash plate is inclined in the opposite direction, the pressure and suction ports are reversed, that is to say, the port which was formerly the pressure port becomes the suction port and the port which was formerly the suction port becomes the pressure port.

In the installation illustrated in the drawings, the drive shaft of the pump 16 is connected by means of a suitable coupling 16' to one end of the armature shaft of an electric motor 18. As will be readily understood, fluid under pressure will be pumped to either of the cylinders 11, 11ª, to move the tiller 10 and rudder connected therewith, in either direction, according to the inclination of the swash plate of the pump 16.

The following means are provided for actuating the control shaft 19 of the pump 16.

Secured to the upper end of the control shaft 19 is a bevel gear 20, which meshes with a similar gear 21, secured to a sleeve-like extension 22 of a differential gear housing 23. The gear housing 23 is provided with an internal gear, with which mesh a plurality of planetary gears 24, carried by a disk or plate 25, secured to one end of a follow-up shaft 26, the other end of which has secured thereto a spur pinion 27. The spur pinion 27 meshes with a spur gear 28, secured to a short shaft 29, which it will be understood is mounted in suitable bearings (not shown). The other end of the short shaft 29 has secured thereto a bevel gear 30, which meshes with a bevel gear 31, secured to the rudder stock 32. The electric motor 18 which drives the pump 16 has connected to the other end of its armature shaft, a sprocket wheel 33, which drives by means of the chain 34, a sprocket wheel 35, the latter being secured to the driving shaft of the pump end of a hydraulic variable speed gear 36 which is of the type disclosed in the United States patent to Harvey D. Williams, No. 925,148 granted June 15, 1909. This type of hydraulic speed gear operates upon substantially the same principle as the pump 16, with the exception that the variable speed gear 36 includes in a unitary structure a combined pump and motor, whereas the pump 16 is merely the pump or A-end, as it is usually designated, of a hydraulic gear. The driving shaft 37 of the motor, or B-end of the variable speed gear 36, has secured to the end thereof, a spur pinion 38, which meshes with the planetary spur gears 24, above referred to. The drive shaft 37 also has secured thereto a second spur pinion 39, which meshes with a spur gear 40, secured to one end of a second follow-up shaft 41. The other end of the second follow-up shaft 41 has connected therewith a bevel gear 42, which meshes with a bevel gear 43, secured, in a manner presently to be described more fully, to the nut 44ª of the control shaft 44 for the variable speed gear 36 (see Fig. 2). The control shaft 44 has secured thereto a bevel gear 45 with which meshes a bevel gear 46, secured to the rotor shaft 47 of an electrical synchronous receiving motor 48.

The synchronous receiver 48 is connected by the five wire electric cable 49 with a synchronous transmitting motor 50, located at a distance from the receiver 48, as, for example, in the pilot house of the ship. The synchronous transmitting and receiving motors are similar in construction and each consist of of a stator S and a rotor R. The stators S as diagrammatically illustrated in Fig. 3, are connected in parallel with any suitable supply of single-phase, alternating current, while the rotors of each of the synchronous motors are three-phase, connected in parallel. The shaft of the rotor of the transmitter 50 has connected thereto a bevel gear 51 with which meshes a bevel gear 52, secured to the shaft of the steering wheel 53.

The operation of the parts so far described is as follows: Assuming that the electric motor 18 is rotating at a constant speed, the cylinder barrel of the pump 16 will be rotating at the same speed, and the drive shaft of the pump end of the variable speed gear 36 will also be rotated preferably at the same speed by means of the sprockets 33, 35 and sprocket chain 34. If the control shafts of the variable speed gear 36 and the pump 16 are set in their neutral positions, there will be no fluid delivered by the pump 16, and consequently no movement of the tiller 10 and rudder will occur. If, now, the steering wheel 53 is rotated to rotate the rotor of the synchronous transmitter 50, a similar rotation of the rotor of the synchronous receiver 48 will also occur, thus causing the bevel gears 46 and 45 to rotate the control shaft 44 of the hydraulic variable speed gear 36. Rotation of this control shaft will, because of its engagement with the nut 44ª, produce a vertical displacement of the shaft which will result in causing an inclination of the tilting box and swash plate of the variable speed gear 36 and thereby cause the driving shaft 37 of said speed gear to be rotated. As no movement of the rudder and tiller 10 have yet occurred, the follow-up shaft 26 will be held stationary and also the planetary gears 24 carried by the disk 25 upon the end of said follow-up shaft. The rotation of the shaft 37 of the variable speed gear will therefore produce a rotation of the differential gear housing 23, the planetary gears 24 acting as idlers, in accordance with the usual operation of such devices. This rotation of the gear housing will be transmitted by the bevel gears 21 and 20 to the control shaft 19 of the variable delivery pump 16, thereby tilting its swash plate and causing the fluid to be pumped, according to the direction in which the steering wheel 53 may have been moved, through either of the pipes 15 or 16, to move the tiller 10 and rudder in the desired direction. As the rudder rotates, its rotation will be transmitted through the bevel gears 31 and 30, and spur gears 28, 27 to the follow-up shaft 26, thus rotating said shaft in the same direction as the shaft 37 of the variable speed gear 36. Therefore, when the steering wheel is brought to rest, at the desired angle of helm, the movement of the rudder will, through the follow-up shaft, bring the control shaft of the pump 16 back to its neutral position, thereby stopping the flow of the fluid to the hydraulic ram cylinders 11, 11ª. At the same time, the second follow-up shaft 41 will also be operated through the gears 39, 40, to turn the nut 44ª of control shaft 44 in the same direction in which said control shaft was rotated by the synchronous receiving motor 48, thus causing a vertical movement of said shaft in a direction opposite to that produced by the motor 48.

It will be understood that the same results would be obtained if the hydraulic variable speed gear 36 were not employed, and the shaft of the synchronous receiver 48 was used to operate, either directly, or through suitable intermediate gearing, the central pinion of the planetary gear 24, 25, but, as the amount of power required for operating the steering gears of large ships is considerable, it is preferable to provide the variable speed gear 36 for operating the central pinion of the planetary gearing. Fig. 2 of the drawing shows the constructional details of the gears and relative arrangement of the speed gear 36 and synchronous receiving motor 48. In order to secure a more compact assembly, the motor 48 is not directly above the gear 36, as shown, that is with the axis of its armature shaft in the same vertical plane as the axis of the shaft 37, but said shafts are preferably inclined to each other at an angle a sufficient amount so that the gear 40 and its housing will clear the motor 48, thereby permitting the gear 45 to be spaced nearer to the gear 43 on the control shaft 44 than if the parts were in vertical alignment. As shown in Fig. 2, the casing of the hydraulic gear 36 serves as a support for the bearings 41ª, 41ᵇ of the follow-up shaft 41, the bearing 41ᵇ preferably being formed integral with the lower section 54 of a gear housing which incloses the gears 42 and 43. The gear housing 54 is bolted to the hydraulic gear casing and has an upper section 54ª in which the gears 45, 46 are inclosed. The nut 44ª of the control shaft 44 is rotatably mounted in suitable anti-friction bearings in the housing section 54 but is held against movement axially within said housing, and has keyed thereto the gear 43. The gear 45 is fixed by the key 55 to a bushing 56 rotatably mounted in anti-friction bearings within the housing section 54ª and said bushing is provided with a plurality of key ways 56ª in which are slidably engaged the ribs or keys 58 of a sleeve 59 which is fixed by the key 59ª to the control shaft 44; this construction of the parts permitting longitudinal movement of the control shaft relatively to the gear 45 but preventing relative rotation between the gear and control shaft.

In order to prevent the operation of the pump 16 at full stroke, when the rudder approaches its extreme positions of inclination, and thus avoid the excessive load which would otherwise be placed on the motor if the pump were operated at full stroke against the greater resistance which must necessarily be overcome in throwing the rudder hard over, the following mechanism is provided: Connected across the pipe lines 15, 17 and in communication with said pipe lines, is a pipe 60, having interposed therein a valve casing 61, in which is slidably mounted a shuttle valve 62. Connected with the valve casing 61, between its ends, is a pipe 63, which leads to the cylinder 64 of a pressure control device 65. As will be readily understood, the shuttle valve will be moved to either end of its valve casing, according to which of the pipes 15 or 17 contains fluid under pressure. As shown in the drawings, the valve is in the position it would occupy if the pipe 17 is under pressure, thus placing said pipe in communication with the pipe 63 and permitting the fluid under pressure to pass to the cylinder 64. Slidably mounted in the cylinder 64 is a piston 66, having a plate 67 connected to its outer end. Secured to the plate 67 is a plurality of rods 68, which extend slidably through suitable holes provided in the lateral flange 69 of the pressure control device. Secured between the flange 69 and nuts 70, mounted upon the ends of said rods 68, are springs 71, the tension of which may be adjusted by means of said nuts. A bracket 72 projects from the pressure control device 65 towards the control shaft 44, and has rotatably secured thereto a three armed lever 73. One arm of the lever 73 is pivotally secured to a collar 74, fixed to the control shaft 44, while the other two arms 73ª, 73ᵇ of said lever are vertically arranged and equally spaced from the plate 67, when the control shaft is in its neutral position.

Assuming that the steering wheel 53 is being rotated to move the rudder in a certain direction, that the rudder has moved to a position approaching its extreme limit of inclination, and that the pressure within the pipe 17, for example, has increased to an amount which it is not advisable to exceed; the pressure within the pipe 17 is communicated through the pipe 63 to the cylinder 64, thus moving the piston 66 and plate 67 against the action of the springs 71 towards the arms 73ª, 73ᵇ of the three armed lever. The movement of the steering wheel, it will be remembered, has caused the control shaft 44 of the variable speed gear 36 to be moved vertically. Assuming that the control shaft is being moved upwardly, the arm 73ᵇ will be moved towards the plate 67. When the control shaft 44 and arm 73ᵇ have been moved an amount such that the arm contacts with the plate 67, the pressure of the plate on the arm will tend to force the control shaft downwardly. It will be readily understood, however, that downward movement of the control shaft by the action of the lever and plate can not be effected without producing relative rotation between the control shaft and nut 44ª. Such relative rotation is permitted by the construction in the following manner: The lead of the screw threads of the control shaft is great enough so that when longitudinal pressure is exerted on the shaft a worm action between the shaft and nut ensues sufficient to exert a considerable torque upon the nut 44ª and thereby rotate it. Rotation of the nut, due to downward movement of the shaft, will be in the same direction as rotation of the shaft to produce upward movement of the latter. Now it will be remembered that during the upward movement of the control shaft 44 by the motor 48, or at least shortly after such upward movement begins, the nut 44ª is being rotated through the medium of the shaft 37, of the hydraulic gear 36 and gears 38 and 39 in the same direction as the control shaft, therefore the rotation of the nut 44ª, through the medium of the control shaft, by the plate 67 and lever 73, will not be resisted by the gears, 38, 39 and shaft 37, and as the rotation of the latter by means of the hydraulic gear 36 necessarily tends to lag behind the rotation of the control shaft 44 by the motor 48, the effect of the rotation of the nut 44ª by the action of the lever 73 and plate is to speed up the rotation of the nut 44ª until its speed equals that of the control shaft 44 so that no further increase in the angle of inclination of the swash plate of the hydraulic gear 36 can be effected after the plate 67 and either of the lever arms 73ª or 73ᵇ are in contacting engagement even though the rotation of the steering wheel is continued.

When the control shaft is moved downwardly by the motor 48 and the pressure mounts as above described, it will be understood that the lever arm 73ª will function in a manner similar to that described above. It will also be understood that the operation of the plate and lever will not interfere with the operation of either of the follow-up shafts 26 and 37 but that such shafts will perform their functions in the manner hereinbefore described so that even through the lever 73 may have functioned as described, as soon as the rotation of the steering wheel has ceased the follow-up shafts will operate to return their respective control shafts to neutral.

In Fig. 5 I have shown a constructional example in which a B-end or motor of a hydraulic gear is substituted for the hydraulic ram of Fig. 1. As shown the motor 80 has its shaft 81 connected to the rudder stock 32 by any suitable gearing such as the bevel gears 82. The motor 80 is connected by the pipes 15 and 17 to the pump 16. As the only difference between the constructional example of Fig. 1 and that of Fig. 5 is in the substitution of a different hydraulic or fluid pressure actuator for the rudder, the remaining parts of the installations being identical in both cases, I have, therefore, in the latter figure, shown only the parts which correspond with the parts shown in the left hand portion of Fig. 1.

It will be understood that changes, variations and modifications from the constructional examples herein disclosed may be resorted to without departing from the spirit of my invention.

I claim:

1. In an electro-hydraulic steering gear for ships, having a rudder and a steering wheel, the combination of a hydraulic actuator connected to said rudder, a reversible fluid pressure pump for pumping fluid to said actuator, said pump having an adjustable control shaft for varying its output, or reversing the direction thereof, a follow-up shaft and gearing connecting it with said rudder to cause it to be actuated directly in accordance with the movement of said rudder, and gearing including a differential gear, connecting said control shaft, said follow-up shaft, and said steering wheel, whereby adjustment of said control shaft is effected through said differential gear influenced by said steering wheel and said follow-up shaft.

2. In an electro-hydraulic steering gear for ships, having a rudder, rudder stock and a steering wheel, the combination of a hydraulic actuator connected to the rudder of the ship, a reversible pump for pumping fluid under pressure to said actuator, said pump having an adjustable control shaft for varying its output, means governed by the rotation of the ship's steering wheel for actuating said control shaft to vary the output of said pump, a follow-up shaft and gearing connecting it with the rudder stock to cause said follow-up shaft to be rotated as said rudder is rotated, a differential gearing, including a first gear, operatively connected with and actuated by rotation of the ship's steering wheel, a second gear connected with said control shaft, and planetary gears connected with said follow-up shaft and interposed between said first and second gears whereby rotation of said rudder stock by the action of said actuator and pump resulting from rotation of said control shaft in a given direction, will produce through said follow-up shaft and planetary gears, a rotation of the control shaft opposite in direction to said given direction.

3. In an electro-hydraulic steering gear for ships, having a rudder, rudder stock and a steering wheel, the combination of a hydraulic actuator, operatively connected to the ship's rudder, a pump for pumping fluid under pressure to said actuator, said pump having an adjustable control shaft and means adapted to be adjusted thereby for varying the output of said pump, said control shaft having a neutral position in which said pump is inoperative to deliver fluid under pressure to said actuator, driving connections between the ship's steering wheel and said control shaft for moving said shaft to vary the direction and the extent of the delivery of said pump in accordance with the direction and extent of rotation of said steering wheel, a follow-up shaft, a gearing connecting said follow-up shaft and the rudder stock, and a differential gear interposed between, and common to said control shaft, said driving connections and said follow-up shaft to cause a rotation of said rudder by said actuator as the result of the adjustment of said control shaft in a given direction by the action of said steering wheel, to produce an adjustment of said control shaft in a direction opposite to said given direction and to return said control shaft to its neutral position.

4. In an electro-hydraulic steering gear for ships, having a rudder and a steering wheel, the combination of a hydraulic actuator operatively connected to the ship's rudder, a variable delivery pump for pumping fluid under pressure to said actuator, said pump being provided with an adjustable controlling member for varying its output, gearing for actuating said controlling member from the ship's steering wheel, and means interposed between said pump and actuator and connected with said gearing for limiting the actuation of said controlling member when, in the movement of said rudder by said actuator to its positions of extreme inclination, the pressure within said pump and actuator exceeds a predetermined amount.

5. In an electro-hydraulic steering gear as set forth in claim 4, in which said means includes a pipe, one end of which is connected with the connecting conduit between said pump and said actuator, a fluid pressure responsive means to which the other end of said pipe is connected, and means, connected with said gearing, and cooperatively associated with said fluid pressure responsive means for limiting the movement of said controlling member.

6. In an electro-hydraulic steering gear for ships, having a rudder and a steering wheel, the combination of a hydraulic actuator operatively connected with the ship's rudder, a variable delivery pump for pumping fluid under pressure to said actuator, said pump having an adjustable controlling member for varying its output, a follow-up shaft having one end thereof operatively connected with the rudder stock, a planetary gearing connected with the other end of said follow-up shaft, an internal gear meshing with said planetary gearing and operatively associated with said controlling member, a variable hydraulic speed gear having a driving shaft and a driven shaft, a second gear driven by said driven shaft and meshing with said planetary gearing and means for varying the speed of said variable speed hydraulic gear from the ship's steering wheel.

7. An electro-hydraulic steering gear for ships, as set forth in claim 6, in which said variable speed hydraulic gear is provided with an adjustable controlling member for varying the speed of said gear, gearing connecting the adjustable controlling member of the variable speed hydraulic gear with the ship's steering wheel, a second controlling shaft operatively connected with the driven shaft of the variable speed hydraulic gear and the gearing connected with the ship's steering wheel.

8. An electro-hydraulic steering gear for ships as set forth in claim 2 in which the means governed by the rotation of the ship's steering wheel includes a variable speed hydraulic gear having a rotatable control shaft, a rotatable nut in which said control shaft is threaded, and a driven shaft on which said first gear is mounted; a second follow-up shaft, and gearing connecting it with said driven shaft and nut to cause the rotatable control shaft for said hydraulic gear to be returned to its neutral position by the rotation of said driven shaft.

9. An electro-hydraulic steering gear for ships as set forth in claim 2 in which the means governed by the rotation of the ship's steering wheel includes a variable speed hydraulic gear having a rotatable control shaft, a rotatable nut in which said control shaft is threaded, and a driven shaft on which said first gear is mounted; a second follow-up shaft, gearing connecting it with said driven shaft and nut to cause the rotatable control shaft for said hydraulic gear to be returned to its neutral position by the rotation of said driven shaft, and a synchronous electro-transmission gearing including a transmitter and a receiver each having a stator and a rotor element, gearing connecting the rotor of said transmitter with the ship's steering wheel and gearing connecting the rotor of said receiver with the control shaft of said hydraulic gear whereby rotation of said steering wheel will cause said control shaft to be rotated.

10. An electro-hydraulic steering gear for ships as set forth in claim 2 in which the means governed by the rotation of the ship's steering wheel includes a variable speed hydraulic gear having a rotatable control shaft, a rotatable nut in which said control shaft is threaded, and a driven shaft on which said first gear is mounted; a second follow-up shaft, and gearing connecting it with said driven shaft and nut to cause the rotatable control shaft for said hydraulic gear to be returned to its neutral position by the rotation of said driven shaft, and means for limiting the output of said pump to said actuator when the rudder approaches its positions of extreme inclination, said means including a fluid pressure responsive member actuated by the pressure of the fluid delivered by said pump, and means operatively associated with said member and with the control shaft of said hydraulic gear to govern the position of said control shaft in accordance with the pressure of the fluid delivered by said pump.

11. In an electro-hydraulic steering gear for ships having a steering wheel, a variable speed hydraulic gear having a driving shaft, a driven shaft, a rotary control shaft, a rotatable nut having a threaded connection with said control shaft, whereby axial movement of said control shaft is effected by relative rotation between said control shaft and nut, characterized by the provision of a pair of gears spaced axially of said control shaft, one of said gears being secured to said nut, the other of said gears being non-rotatably connected to said control shaft but permitting relative longitudinal movement between said control shaft and said other gear, gearing connecting said other gear with the ship's steering wheel to cause rotation of said wheel to rotate said control shaft relatively to said nut and produce longitudinal movement of said control shaft, and gearing connecting said one gear with the driven shaft of said hydraulic gear for producing rotation of said nut in the same direction as that imparted to said control shaft for producing a rotation of said driven shaft and thus automatically returning said control shaft to its neutral position by the rotation of said driven shaft.

12. An electro-hydraulic gear as set forth in claim 11 in which, the gearing connecting the ship's steering wheel with said other gear includes a pair of synchronous electric motors, one mounted on the casing of said hydraulic gear and geared to said other gear and the other geared to the ship's steering wheel.

13. An electro-hydraulic gear as set forth in claim 11, in which a housing for said pair of gears is associated with the casing of said hydraulic gear to form therewith a unitary structure.

14. An electro-hydraulic gear as set forth in claim 11, in which a housing for said pair of gears is associated with the casing of said hydraulic gear to form therewith a unitary structure, the gearing connecting the ship's steering wheel with said other gear includes a pair of synchronous electric motors, one mounted on the casing of said hydraulic gear and geared to said other gear and the other geared to the ship's steering wheel.

15. In an electro-hydraulic steering gear for ships having a rudder, the combination of a hydraulic ram operatively connected to the ship rudder, a reversible variable delivery pump for pumping fluid under pressure to said ram, said pump being provided with an adjustable controlling member for varying its output, an hydraulic variable speed transmission device for operating said controlling member by power, an adjustable controlling member for said hydraulic variable speed transmission device, and a distant control for said last named controlling member.

16. In an electro-hydraulic steering gear for ships having a rudder, the combination of a hydraulic ram operatively connected to the ship rudder, a reversible variable delivery pump for pumping fluid under pressure to said ram, said pump being provided with an adjustable controlling member for varying its output, an hydraulic variable speed transmission device for operating said controlling member by power, an adjustable controlling member for said hydraulic variable speed transmission device, and an electric synchronous distant transmission for operating said last named controlling member.

17. In an electro-hydraulic steering gear for ships having a rudder, the combination of a hydraulic actuator operatively connected to the ship rudder, a reversible variable delivery pump for pumping fluid under pressure to said motor, said pump being provided with an adjustable controlling member for varying its output, an hydraulic variable speed transmission device for operating said controlling member by power, an adjustable controlling member for said hydraulic variable speed transmission device, and an electric synchronous distant transmission for operating said last named controlling member.

18. In an electro-hydraulic steering gear for ships having a rudder, the combination of a hydraulic ram operatively connected to the ship rudder, a reversible variable delivery pump for pumping fluid under pressure to said ram, said pump being provided with an adjustable controlling member for varying its output, and an electric synchronous distant transmission for controlling the actuation of said controlling member.

In testimony whereof I have hereunto set my hand.

JOHN J. CRAIN.